United States Patent
Cho

(10) Patent No.: US 8,134,564 B2
(45) Date of Patent: Mar. 13, 2012

(54) PORTABLE COMPUTER AND CONTROL METHOD THEREFOR

(75) Inventor: Seob Cho, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 981 days.

(21) Appl. No.: 11/651,490

(22) Filed: Jan. 10, 2007

(65) Prior Publication Data

US 2007/0176936 A1    Aug. 2, 2007

(30) Foreign Application Priority Data

Feb. 1, 2006 (KR) .................. 10-2006-0009745

(51) Int. Cl.
G06F 13/14 (2006.01)
(52) U.S. Cl. ................................................. 345/520
(58) Field of Classification Search ............... None
See application file for complete search history.

(56) References Cited

U.S. PATENT DOCUMENTS

| | | | | |
|---|---|---|---|---|
| 6,314,479 B1 * | 11/2001 | Frederick et al. | ............... | 710/63 |
| 6,346,927 B1 * | 2/2002 | Tran et al. | ............... | 345/1.1 |
| 6,943,753 B2 * | 9/2005 | Shirasaki et al. | ............... | 345/3.1 |
| 7,009,616 B2 * | 3/2006 | Mendelson et al. | ............... | 345/519 |
| 2002/0068558 A1 | 6/2002 | Janik | | |
| 2002/0089589 A1 | 7/2002 | Adair et al. | | |
| 2002/0149541 A1 | 10/2002 | Shin | | |
| 2005/0239401 A1 | 10/2005 | Nam | | |

FOREIGN PATENT DOCUMENTS

| | | |
|---|---|---|
| CN | 1234546 | 11/1999 |
| CN | 1678052 | 10/2005 |
| KR | 2003-60357 | 7/2003 |
| KR | 20-0338034 | 12/2003 |
| KR | 2004-98341 | 11/2004 |

OTHER PUBLICATIONS

User Aq_Bi, "Laptop monitor input". Halfbakery Website, Oct. 15, 2005 [retreived on Jun. 2, 2010]. Retreived from the Internet: <URL:www.halfbakery.com/idea/Laptop_20monitor_20input>.*

* cited by examiner

Primary Examiner — Ulka Chauhan
Assistant Examiner — Robert Bader
(74) Attorney, Agent, or Firm — Jefferson IP Law, LLP

(57) ABSTRACT

A portable computer including a display unit, and a video processor generating and supplying a first video signal to the display unit, includes a video adaptor outputting the first video signal to the outside, and receiving a second video signal from an external input source, and a control unit for supplying the second video signal to the display unit when the external input source is connected to the video adaptor. Thus, the present invention provides a portable computer and a control method, which can receive a video signal from an external input source through one existing output port for outputting a video signal without adding a separate input port.

31 Claims, 4 Drawing Sheets

PORTABLE COMPUTER AND CONTROL METHOD THEREFOR

CROSS-REFERENCE TO RELATED APPLICATIONS

This application claims all benefits accruing under 35 U.S.C. §119 from Korean Patent Application No. 2006-9745, filed on Feb. 1, 2006, in the Korean Intellectual Property Office, the disclosure of which is incorporated herein by reference.

BACKGROUND OF THE INVENTION

1. Field of the Invention

The present invention relates to a computer system and a control method therefor, and more particularly, to a computer system, such as a portable computer, and a control method which can receive a video signal from an input source such as an external computer and provide a visual display of an image based on the video signal.

2. Related Art

Generally, a computer system supports various communication ports to communicate with an external device. Such a computer system is generally a portable computer, such as a desktop, laptop, notebook or palmtop computer, a personal digital assistant (PDA) and a mobile device. For example, the portable computer supports a monitor output port arranged to connect with an external display device, and outputs a video signal to the external display device, via the monitor output port. As a result, the external display device can provide a visual display of an image that is the same image displayed at an internal display panel provided to the portable computer. Examples of such a monitor output port include a D-sub port for outputting an analog video signal, and a DVI (digital visual/video interface) port for outputting a digital video signal.

However, when the portable computer does not output a video signal to the external display device, but rather receives a video signal from an external input source, such as an external computer, a separate video input port, such as a separate jack, must be provided.

In other words, a separate jack is needed for installation in the portable computer so as to receive a video signal from an external input source between the internal display panel and an internal graphic processor. In addition, a video multiplexer is also needed for installation in the portable computer so as to selectively output either a video signal received from an external input source or an internal video signal to the internal display panel.

However, if the separate video input port and the multiplexer are additionally mounted or installed in the portable computer, the simplicity and the portability of such a portable computer can be compromised and deteriorated. Moreover, the configuration of such a portable computer may get complicated.

SUMMARY OF THE INVENTION

Several aspects and example embodiments of the present invention provide a computer system, such as a portable computer and a control method which can receive a video signal from an external input source through one existing output port for outputting a video signal without adding a separate input port.

Additional aspects and/or advantages of the invention will be set forth in part in the description which follows and, in part, will be obvious from the description, or may be learned by practice of the invention.

In accordance with an example embodiment of the present invention, a computer system such as a portable computer is provided with a display unit; a video processor to supply a first video signal to the display unit; a video adaptor arranged to supply the first video signal to the outside, and to receive a second video signal from an external input source; and a control unit to supply the second video signal to the display unit, when the external input source is connected to the video adaptor.

According to an aspect of the invention, the control unit comprises a switching unit arranged to switch "ON" and "OFF" a data line between the video processor and the video adaptor, and a switching control unit arranged to control the switching unit to switch "OFF" the data line between the video processor and the video adaptor when the external input source is connected to the video adaptor, and to switch "ON" the data line between the video processor and the video adaptor when an external output device is connected to the video adaptor.

According to an aspect of the invention, the control unit further comprises an output selector for selectively supplying one of the first video signal from the video processor and the second video signal input via the video adaptor to the display unit.

According to an aspect of the invention, the video adaptor comprises a VGA (video graphic adaptor) for outputting an analog signal and/or a digital signal to the outside.

According to an aspect of the invention, the computer system further comprises a connection sensor arranged to generate a sensing signal to the control unit indicating whether an external device is connected to the video adaptor.

According to an aspect of the invention, the switching control unit detects whether a DDC (display data channel) signal is inputted from the external device via the VGA (video graphic adaptor), determines the external device to be the external output device when the DDC signal is inputted, and determines the external device to be the external input source when the DDC signal is not inputted.

According to an aspect of the invention, the switching control unit controls the switching unit based on the sensing signal from the connection sensor and the existence or non-existence of the DDC signal from the external device.

According to an aspect of the invention, the computer system further comprises a user selector arranged to enable a user to select one of the first video signal and the second video signal, wherein the switching control unit controls the output selector to output a video signal selected through the user selector to the display unit.

According to an aspect of the invention, the switching control unit controls the output selector to supply the second video signal to the display unit when the external input source is determined to be connected to the VGA (video graphic adaptor).

According to an aspect of the invention, the computer system further comprises a format converter arranged to convert the format of the second video signal inputted from the external input source suitable to be output to the display unit.

In accordance with another example embodiment of the present invention, a control method comprising a display unit, a video processor generating and supplying a first video signal to the display unit, a video adaptor outputting the first video signal to the outside and receiving a second video signal from an external input source, comprising determining whether an external device connected to the video adaptor is the external input source or an external output device, and supplying the second video signal to the display unit when the external input source is determined to be connected to the video adaptor.

According to an aspect of the invention, the control method further comprises switching "OFF" a data line between the video processor and the video adaptor when the external input source is determined to be connected to the video adaptor, and switching "ON" the data line between the video processor and the video adaptor when the external output device is determined to be connected to the video adaptor.

According to an aspect of the invention, the determining the external input source comprises determining whether a DDC signal is inputted through the video adaptor, and determining the connected external device to be the external input source when the DDC signal is not inputted, and determining the connected external device to be the external output device when the DDC signal is inputted.

According to an aspect of the invention, the control method further comprises sensing whether the external device is connected to the video adaptor, and outputting a sensing signal.

According to an aspect of the invention, the control method further comprises selecting one of the first video signal and the second video signal by a user, wherein the supplying the video signal to the display unit comprises supplying a video signal selected by the user to the display unit.

According to an aspect of the invention, the supplying the video signal to the display unit comprises supplying the second video signal inputted from the external input source to the display unit when the external input source is connected to the video adaptor.

According to an aspect of the invention, the control method further comprises switching "ON" a data line between the video processor and the video adaptor when the external device is determined not to be connected to the video adaptor.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Figure 1:
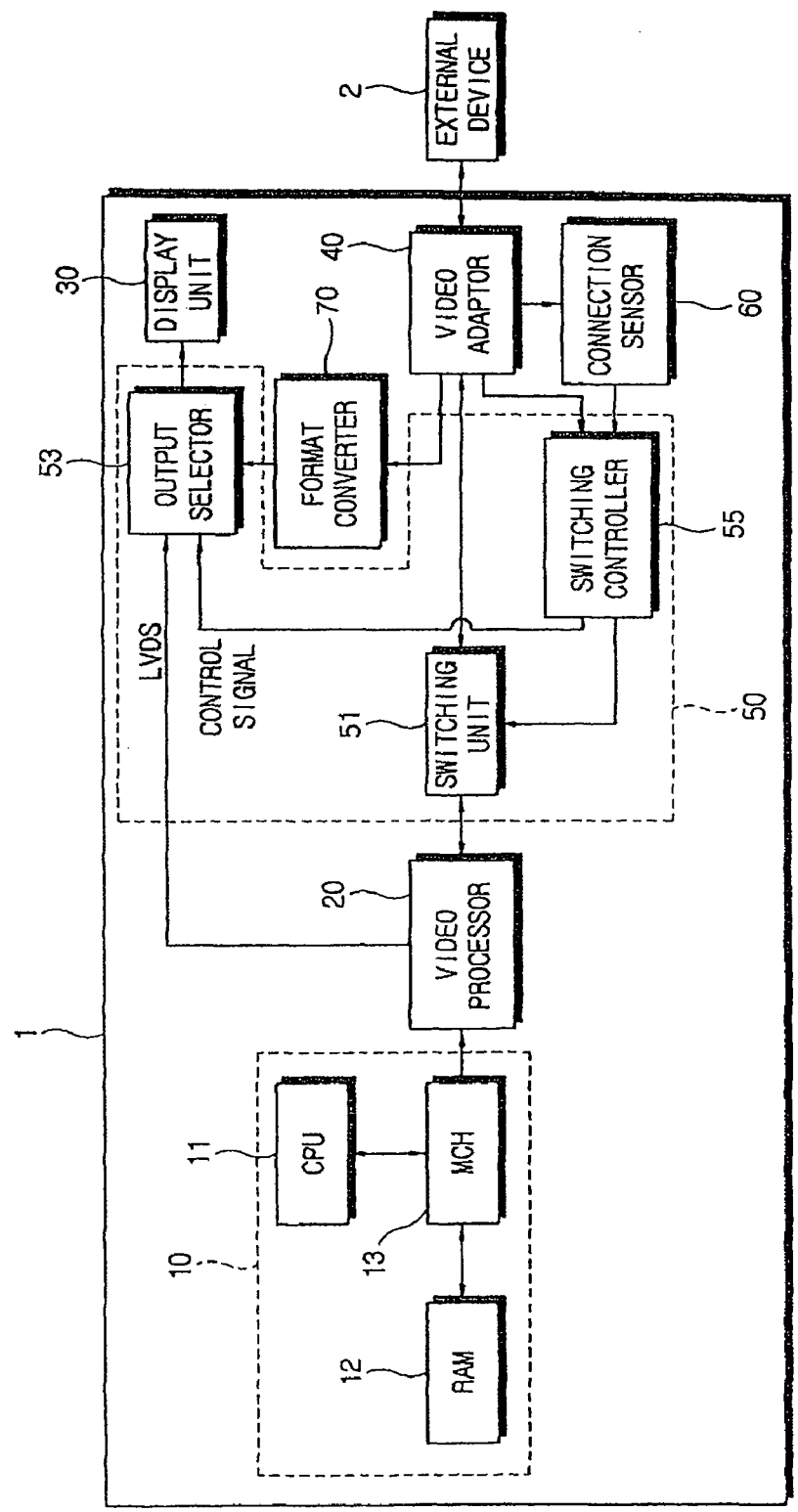
FIG. 1 is a block diagram of a computer system, such as a portable computer according to an example embodiment of the present invention.

Reference will now be made in detail to the embodiments of the present invention, examples of which are illustrated in the accompanying drawings, wherein like reference numerals refer to like elements throughout. The embodiments are described below in order to explain the present invention by referring to the figures.

FIG. 1 is a control block diagram of a computer system, such as a portable computer according to an example embodiment of the present invention.

As shown in FIG. 1, a portable computer 1 includes a main system unit 10, a video processor 20, a display unit 30, a video adaptor 40, and a control unit 50.

The main system unit 10 includes a CPU (central processing unit) 11, a nonvolatile RAM (random access memory) 12, and an MCH (memory control hub) 13 arranged to control data among the CPU 11, the RAM 12 and the video processor 20.

The video processor 20 generates a digital image signal based on a digital image interface to be supplied to the display unit 30, and includes graphic chips, etc. The digital image interface can be an LVDS (low voltage differential signaling) interface type, and the display unit 30 can be an LCD (liquid crystal display) module. However, alternatively, the digital image interface may be other interface types, and the display unit 30 may be other types of display modules.

The video processor 20 outputs a video signal processed to the outside through the video adaptor 40. The format of the outputted video signal by the video processor 20 may be a digital signal or an analog RGB signal according to a supportable output format. Here, the video adaptor 40 refers to a monitor output port to be connected with an external display device, and may be a DVI port for transmitting a digital signal or a D-sub port for transmitting an analog RGB signal according to an output format which the video processor 20 supports.

Hereinafter, a video signal generated by the video processor 20 refers to a first video signal, and a video signal inputted from an external input source refers to a second video signal.

The control unit 50 determines whether an external device 2 connected to the video adaptor 40 is an input source or an output device. In the case that an external device 2 connected to the video adaptor 40 is an input source, the control unit 50 selectively supplies the second video signal from the input source, i.e., the external device 2, to the display unit 30.

As shown in FIG. 1, the control unit 50 includes a switching unit 51, an output selector 53, and a switching controller 55 for controlling the switching unit 51 and the output selector 53.

The switching unit 51 switches "ON" and "OFF" a data line between the video processor 20 and the video adaptor 40, and may include an analogue switch. The output selector 53 selectively supplies the display unit 30 with one of the first video signal, that is, an LVDS signal supplied from the video processor 20 and the second video signal inputted from an external input source according to a control signal of the switching controller 55. The output selector 53 may include a bus switch IC. The switching controller 55 may include a control circuit provided with a switching element and/or a gate element, a microcomputer, etc.

The switching controller 55 can determine whether an external device 2 connected to the video adaptor 40 is an input source or an output device by determining whether a DDC (display data channel) signal is inputted from the external device 2. The switching controller 55 determines that the external device 2 is an input source if the DDC signal is not inputted from the external device 2. Alternatively, the switching controller 55 determines that the external device 2 is an output device if the DDC signal is inputted from the external device 2. An input source may be an external computer or other input devices, and an output device may be an external display device or other output device.

In addition, a connection sensor 60 is further provided to sense whether an external device 2 is connected to a video adaptor 40, and to output a sensing signal. The connection sensor 60 may utilize a predetermined pin provided to the video adaptor 40 as a connection sensing pin. The switching controller 55 can determine whether an external device 2 is connected to the video adaptor 40 based on the sensing signal outputted from the connection sensor 60.

The switching controller 55 applies the control signal so that the output selector 53 selects and outputs one of the first video signal and the second video signal. For example, if the switching controller 55 determines that an input source is connected to the video adaptor 40, the switching controller 55 controls the output selector 53 to output the second video signal.

Also, the switching controller 55 may be controlled to select a source according to inputting of a user. Thus, the video adaptor 40 used as an output port can be used as an input port.

A format converter 70 is further provided to convert the second video signal inputted through the video adaptor 40 to be adapted to an output format of the display unit 30. For example, if an analog RGB signal is inputted, the format converter 70 may be an A/D converter for converting the analog RGB signal to a digital signal.

Hereinafter, a control method for the portable computer 1 according to an example embodiment of the present invention will be described by referring to FIGS. 1 and 2 herein below.

Figure 2:
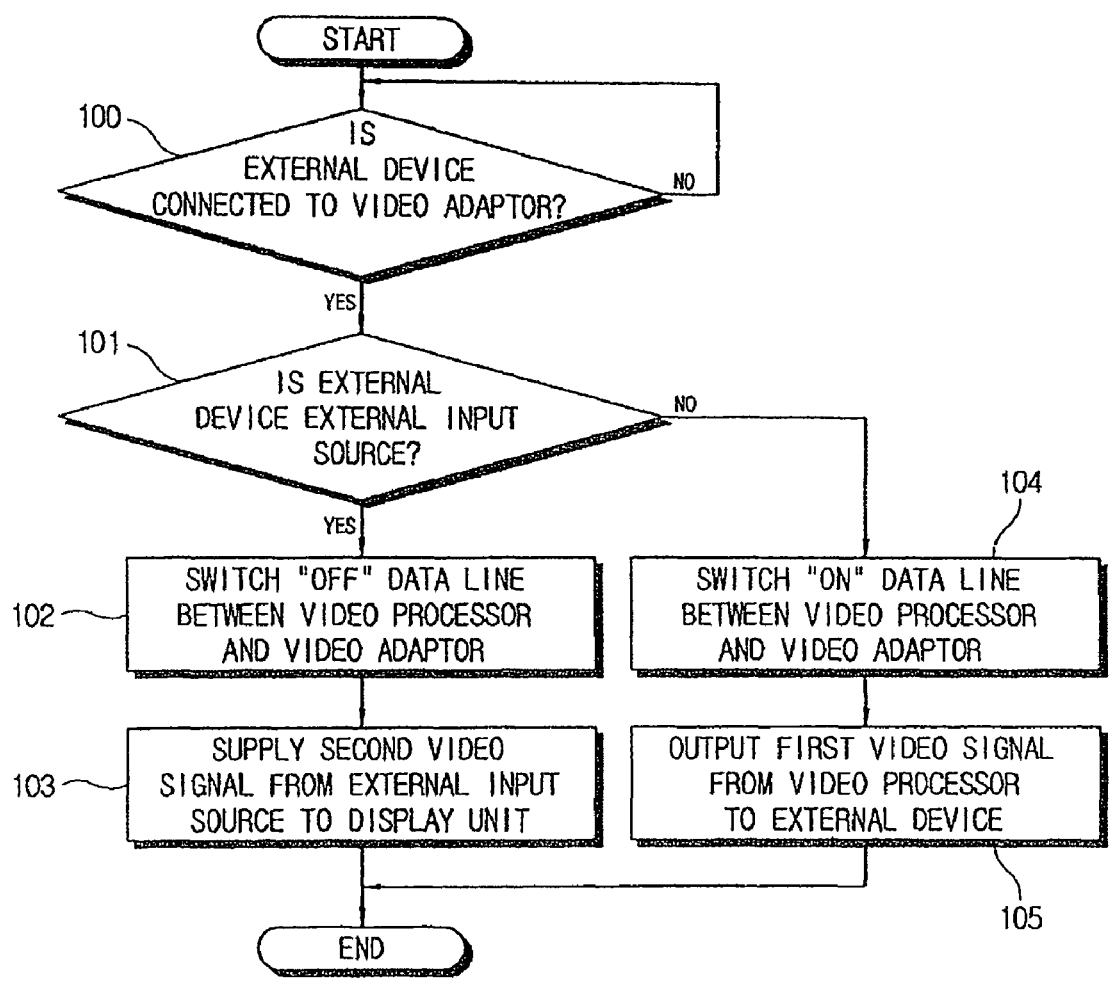
FIG. 2 is a control flowchart of the portable computer according to an example embodiment of the present invention.

As shown in FIGS. 1 and 2, the control unit 50 determines whether an external device 2 is connected to a video adaptor 40 based on a sensing signal from the connection sensor 60 at block 100. In the case that an external device 2 is determined to be connected to the video adaptor 40, the control unit 50 determines whether the external device 2 is an external input source based on the existence or nonexistence of a DDC signal at block 101. If the DDC signal is not inputted, the control unit 50 determines that the connected external device 2 is an input source. However, if the DDC signal is inputted, the control unit 50 determines that the connected external device 2 is an external display device.

In the case that the external device 2 is determined to be an external input source, the control unit 50 controls the switching unit 51 by way of the switching controller 55 to switch "OFF" a data line between the video processor 20 and the video adaptor 40 at block 102. Accordingly, the control unit 50 can prevent the first video signal from the video processor 20 from being outputted to an external input source.

Then, the control unit 50 controls that the second video signal inputted from the connected external input source is supplied to the display unit 30 at block 103. Here, the control unit 50 may apply a selecting signal according to an input of a user.

For example, in the case that a gate circuit is provided as the switching controller 55, if a high signal is inputted to both the connection sensor 60 and a DDC signal line, an enable signal for outputting the second video signal may be designed to be inputted to the output selector 53.

If the DDC signal is inputted, the control unit 50 determines that the external device 2 is an external display device, and controls the switching unit 51 by way of the switching controller 55 to switch "ON" a data line between the video processor 20 and the video adaptor 40 at block 104. Then, the control unit 50 controls that the first video signal outputted from the video processor 20 is outputted to the connected external display device at block 105. Accordingly, the portable computer 1 can output and receive video signals through one output port.

Hereinafter, a portable computer and a control method according to another example embodiment of the present invention will be described by referring to FIGS. 3 and 4 herein below.

Figure 3:
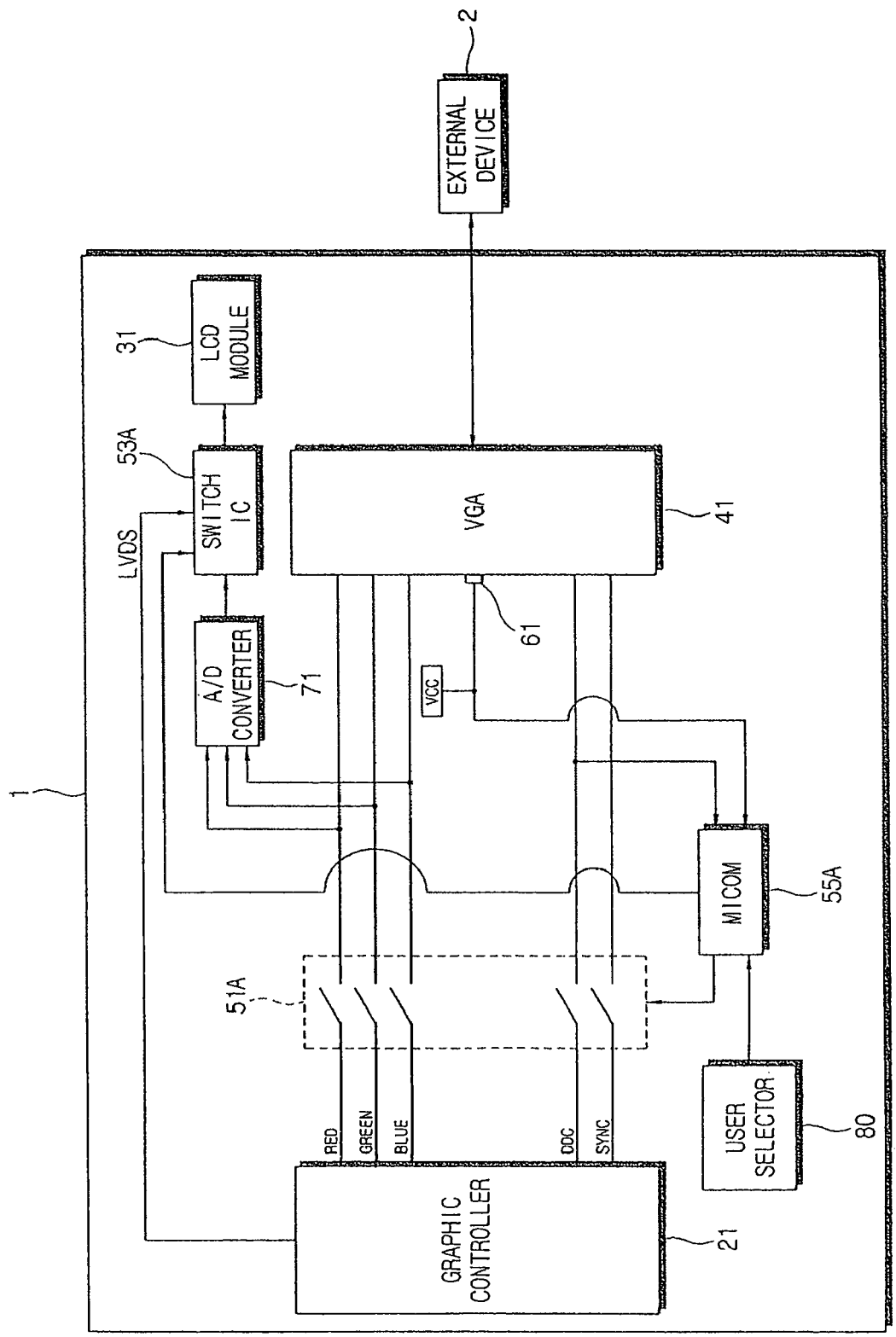
FIG. 3 is a control block diagram of a computer system such as a portable computer according to another example embodiment of the present invention.

As shown in FIG. 3, a portable computer 1 according to another example embodiment of the present invention includes a graphic controller 21, an LCD module 31 serving as a display unit, a video graphic adaptor VGA 41, an analog switch 51A, a switch IC 53A, and a microcomputer MICOM 55A.

For example, a RGB analog signal is outputted from the graphic controller 21 to the VGA 41, and the VGA 41 is a D-sub output port.

The graphic controller 21 generates a video signal, and supplies the same to the LCD module 31 in an LVDS format, and supplies the same to an external display device in an analog format.

Here, the analog switch 51A switches "ON" and "OFF" a data line between the graphic controller 21 and the VGA 41 according to a control of the MICOM 55A. In the case that the analog switch 51A is switched "ON", the RGB signal generated from the graphic controller 21 can be supplied to an external device 2, via the VGA 41.

The switch IC 53A outputs to the LCD module 31 with one of a first video signal which is the LVDS signal from the graphic controller 21 and a second video signal inputted from an external input source, such as an external computer according to a control of the MICOM 55A. Here, the switch IC 53A may include a port for receiving a control signal from the MICOM 55A for selecting one of the first video signal and the second video signal.

A predetermined pin of the VGA 41 may be utilized as a connection sensor pin 61. If an external device 2 is connected to the VGA 41, a VCC is supplied so that a high signal is inputted to the MICOM 55A. If an external device 2 is not connected thereto, a low signal is inputted to the MICOM 55A.

Thus, the MICOM 55A can determine whether an external device 2 is connected to the VGA 41 by way of the connection sensor pin 61. Also, the MICOM 55A can determine whether a DDC signal exists via a branch line of a DDC signal line.

In addition, a user selector 80 is provided to enable a user to select between a first video signal and a second video signal. The user selector 80 may include a keyboard, a touch pad, and an input/output controller. The MICOM 55A applies a selecting signal to the switch IC 53A to convert a screen according to the existence or nonexistence of the DDC signal and the selection via the user selector 80.

An A/D converter 71 is further provided to convert an analog signal inputted from an external input source into a digital format suitable to be output via the LCD module 31.

Hereinafter, a control method for the portable computer 1 according to another example embodiment of the present invention will be described by referring FIGS. 3 and 4 herein below.

Figure 4:
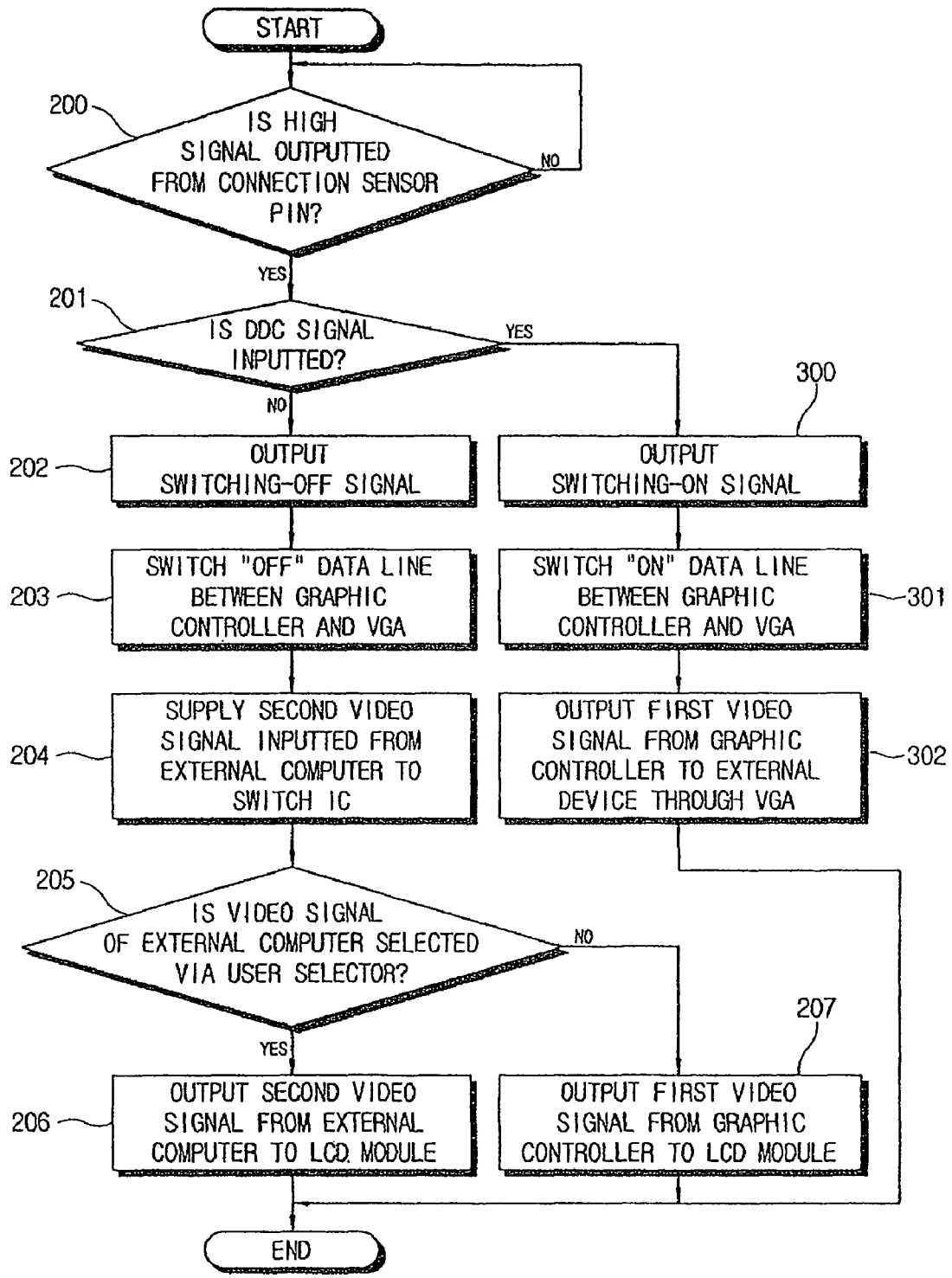
FIG. 4 is a control flowchart of the portable computer according to another example embodiment of the present invention.

As shown in FIGS. 3 and 4, the connection sensor pin 61 outputs a sensing signal when the external device 2 is connected to the VGA 41, and the MICOM 55A determines whether a high signal is outputted from the connection sensor pin 61 at block 200. If the high signal is outputted from the connection sensor pin 61, the MICOM 55A determines whether the DDC signal is inputted via the DDC signal line at block 201.

If the DDC signal is not inputted via the DDC signal line, the MICOM 55A determines that the connected external device 2 is an external computer, that is, an input source. Then, the MICOM 55A outputs a switching-off signal to the analog switch 51A at block 202, and switches "OFF" the data line between the graphic controller 21 and the VGA 41 at block 203. Thus, the second video signal inputted from the external computer 2 is supplied to the switch IC 53A at block 204.

Then, the MICOM 55A determines whether the second video signal from the external computer is selected via the user selector 80 at block 205. If the second video signal is selected via the user selector 80, the MICOM 55A applies a control signal so that the switch IC 53A outputs the second video signal to the LCD module 31. Thus, the switch IC 53A outputs the second video signal to the LCD module 31 at block 206. Accordingly, the LCD module 31 of the portable computer 1 can display a video signal from an external computer 2.

However, if the first video signal is selected via the user selector 80, the MICOM 55A applies an enable signal to a first port of the switch IC 53A and applies a disable signal to a second port thereof, and accordingly, the first video signal from the graphic controller 21 is outputted to the LCD module 31 at block 207.

Referring back to block 201, when the DDC signal is determined to be inputted via the DDC signal line, the MICOM 55A outputs a switching-on signal to the analog switch 51A at block 300. Then, the analog switch 51A switches "ON" the data line between the graphic controller 21 and the VGA 41 at block 301. Thus, the first video signal having the analog RGB format from the graphic controller 21 is outputted to the connected external device 2 through the VGA 41 at block 302.

Accordingly, the video output port of the portable computer according to example embodiments of the present invention can be used as an input port. Thus, in the case that the video output ports of a plurality of portable computers according to the present invention are connected through a distributor, one portable computer can be an input source, and other portable computers can display the same images inputted from one input source. Thus, an input video signal can be inputted through a conventional video output port without a separate input device. This can be useful and advantageously applied to a meeting, a conference, etc.

The VGA 41 outputs/inputs an analog signal, but alternatively, the present invention can be applied to a case that a DVI input/output is supported. At this time, a converting process of the A/D converter 71 is omitted. Also, the MICOM 55A selects one of the first video signal and the second video signal according to an input of a user, but alternatively, a gate circuit can be applied. If the second video signal is inputted, the second video signal can be automatically outputted irrespective of an input of a user.

As described above, a portable computer and a control method according to the present invention can receive a video signal from an external input source through one output port for outputting a video signal without a separate input port.

Various components of the portable computer, such as the switching unit 51, the output selector 53, the controller 55, the format converter 70 and the connection sensor 60, as shown in FIG. 1, can be integrated into a single control unit, or alternatively, can be implemented in software or hardware, such as, for example, a field programmable gate array (FPGA) and an application specific integrated circuit (ASIC). Likewise, the graphic controller 21, the analog switch 51A, the A/D converter 71, the switch IC and MICOM 55A, as shown in FIG. 3, can be integrated into a single control hub or implemented in software or hardware. As such, it is intended that the processes described herein be broadly interpreted as being equivalently performed by software, hardware, or a combination thereof. As previously discussed, software modules can be written, via a variety of software languages, including C, C++, Java, Visual Basic, and many others. These software modules may include data and instructions which can also be stored on one or more machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Instructions of the software routines or modules may also be loaded or transported into the wireless cards or any computing devices on the wireless network in one of many different ways. For example, code segments including instructions stored on floppy discs, CD or DVD media, a hard disk, or transported through a network interface card, modem, or other interface device may be loaded into the system and executed as corresponding software routines or modules. In the loading or transport process, data signals that are embodied as carrier waves (transmitted over telephone lines, network lines, wireless links, cables, and the like) may communicate the code segments, including instructions, to the network node or element. Such carrier waves may be in the form of electrical, optical, acoustical, electromagnetic, or other types of signals.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. Accordingly, it is intended, therefore, that the present invention not be limited to the various example embodiments disclosed, but that the present invention includes all embodiments falling within the scope of the appended claims.

What is claimed is:

1. A computer system comprising a display unit, and a video processor for generating a first video signal, the computer system comprising:

a video adaptor for supplying the first video signal to a monitor, and for receiving a second video signal from an external input source, which is different from the monitor; and a control unit for controlling the supply of the first video signal to the monitor in response to the monitor being connected to the video adapter and a Display Data Channel (DDC) signal input from the monitor, and for controlling the supply of the second video signal to the display unit in response to the external input source being connected to the video adaptor and the external input source not inputting the DDC signal.

2. The computer system according to claim 1, wherein the control unit comprises:
   a switching unit arranged to switch "ON" and "OFF" a data line between the video processor and the video adaptor; and
   a switching control unit arranged to control the switching unit to switch "OFF" the data line between the video processor and the video adaptor when the external input source is connected to the video adaptor, and to switch "ON" the data line between the video processor and the video adaptor when an external output device is the monitor and is connected to the video adaptor.

3. The computer system according to claim 2, wherein the control unit further comprises an output selector for selectively supplying one of the first video signal from the video processor and the second video signal input via the video adaptor to the display unit.

4. The computer system according to claim 3, wherein the video adaptor comprises a Video Graphic Adaptor (VGA) for outputting an analog signal and/or a digital signal to the outside.

5. The computer system according to claim 4, further comprising a connection sensor arranged to generate a sensing signal to the control unit indicating whether an external device is connected to the VGA.

6. The computer system according to claim 4, wherein the switching control unit detects whether the DDC signal is input from the external device via the VGA, determines the external device to be the external output device when the DDC signal is input, and determines the external device to be the external input source when the DDC signal is not input.

7. The computer system according to claim 5, wherein the switching control unit detects whether the DDC signal is input from the external device via the VGA, and determines the external device to be the external output device when the DDC signal is input, and determines the external device to be the external input source when the DDC signal is not input.

8. The computer system according to claim 5, wherein the switching control unit controls the switching unit based on the sensing signal from the connection sensor and the existence or nonexistence of the DDC signal from the external device.

9. The computer system according to claim 6, further comprising a user selector arranged to enable a user to select one of the first video signal and the second video signal,
   wherein the switching control unit controls the output selector to output a video signal selected through the user selector to the display unit.

10. The computer system according to claim 6, wherein the switching control unit controls the output selector to supply the second video signal to the display unit, when the external input source is determined to be connected to the VGA.

11. The computer system according to claim 6, further comprising a format converter arranged to convert the format of the second video signal input from the external input source to a format suitable to be output to the display unit.

12. The computer system according to claim 7, further comprising a user selector arranged to enable a user to select one of the first video signal and the second video signal,
   wherein the switching control unit controls the output selector to output a video signal selected through the user selector to the display unit.

13. The computer system according to claim 7, wherein the switching control unit controls the output selector to supply the second video signal to the display unit, when the external input source is determined to be connected to the VGA.

14. The computer system according to claim 7, further comprising a format converter arranged to convert the format of the second video signal input from the external input source to a format suitable to be output to the display unit.

15. A control method for a portable computer comprising a display unit, a video processor for generating a first video signal, a video adaptor for supplying the first video signal to a monitor and for receiving a second video signal from an external input source, which is different from the monitor, the method comprising:
   determining whether an external device connected to the video adaptor is the external input source or an external output device; and
   supplying the first video signal to the monitor in response to the determination that the monitor is connected to the video adaptor and a Display Data Channel (DDC) signal input from the monitor, and supplying the second video signal to the display unit in response to the determination that the external input source is connected to the video adaptor and the external input source not inputting the DDC signal.

16. The control method according to claim 15, further comprising:
   switching "OFF" a data line between the video processor and the video adaptor, when the external input source is determined to be connected to the video adaptor; and
   switching "ON" the data line between the video processor and the video adaptor, when an external output device is the monitor and is determined to be connected to the video adaptor.

17. The control method according to claim 16, wherein the determining the external input source comprises determining whether the DDC signal is input through the video adaptor, and
   determining the connected external device to be the external input source when the DDC signal is not input, and determining the connected external device to be the external output device when the DDC signal is input.

18. The control method according to claim 15, further comprising sensing whether the external device is connected to the video adaptor and outputting a sensing signal.

19. The control method according to claim 15, further comprising:
   selecting one of the first video signal and the second video signal by a user,
   wherein the supplying the video signal to the display unit comprises supplying a video signal selected by the user to the display unit.

20. The control method according to claim 18, further comprising:
   selecting one of the first video signal and the second video signal by a user,
   wherein the supplying the video signal to the display unit comprises supplying a video signal selected by the user to the display unit.

21. The control method according to claim 15, wherein the supplying the video signal to the display unit comprises supplying the second video signal input from the external input source to the display unit when the external input source is connected to the video adaptor.

22. The control method according to claim 18, wherein the supplying the video signal to the display unit comprises supplying the second video signal input from the external input source to the display unit when the external input source is connected to the video adaptor.

23. The control method according to claim 15, further comprising switching "ON" a data line between the video processor and the video adaptor, when the external device is determined not to be connected to the video adaptor.

24. A computer system comprising:
- a display panel to provide a visual display of one of a first video signal and a second video signal;
- a video processor to generate the first video signal;
- a video adaptor arranged to supply the first video signal to an output device that is a monitor and to receive the second video signal from an external input source, which is different from the monitor; and
- a control unit configured to control selection between the first video signal and the second video signal for a visual display, via the display panel,
- wherein the control unit selects the first video signal to the monitor in response to the monitor being connected to the video adaptor and a Display Data Channel (DDC) signal input from the monitor, and the second video signal to the display panel in response to the external input source being connected to the video adaptor and the external input source not inputting the DDC signal.

25. The computer system according to claim 24, wherein the control unit comprises:
- a switching unit arranged to switch "ON" and "OFF" a data line between the video processor and the video adaptor;
- a switching controller to control the switching unit to switch "OFF" the data line between the video processor and the video adaptor when the external device connected to the video adaptor is an input source, and to switch "ON" the data line between the video processor and the video adaptor when the external device connected to the video adaptor is the output device; and
- an output selector to selectively supply one of the first video signal and the second video signal to the display panel.

26. The computer system according to claim 24, wherein the video adaptor corresponds to a Video Graphic Adaptor (VGA) for outputting an analog signal and/or a digital signal to the outside.

27. The computer system according to claim 24, further comprising a connection sensor arranged to generate a sensing signal to the control unit indicating whether an external device is connected to the video adaptor.

28. The computer system according to claim 27, wherein the switching controller is further configured to detect whether the DDC signal is received from the external device via the video adaptor, to determine that the external device is one of an external input source and an output device in accordance with the DDC signal.

29. The computer system according to claim 28, wherein the switching controller is further configured to control the switching unit based on the sensing signal from the connection sensor and the existence or nonexistence of the DDC signal.

30. The computer system according to claim 26, further comprising a user selector arranged to enable a user to select one of the first video signal and the second video signal for a visual display at the display panel.

31. The computer system according to claim 30, further comprising a format converter arranged to convert the format of the second video signal received from the external input source to a format suitable to be displayed at the display panel.

* * * * *